Dec. 23, 1969   W. D. WALTHER   3,485,513
FIFTH WHEEL COUPLER ASSEMBLY
Filed Jan. 15, 1969   3 Sheets-Sheet 1

INVENTOR.
WILLIAM DEAN WALTHER
BY Hamilton, Cook,
Renner & Kenner
ATTORNEYS

INVENTOR.
WILLIAM DEAN WALTHER
BY Hamilton, Cook,
Renner & Kenner
ATTORNEYS

Dec. 23, 1969  W. D. WALTHER  3,485,513
FIFTH WHEEL COUPLER ASSEMBLY
Filed Jan. 15, 1969  3 Sheets-Sheet 3
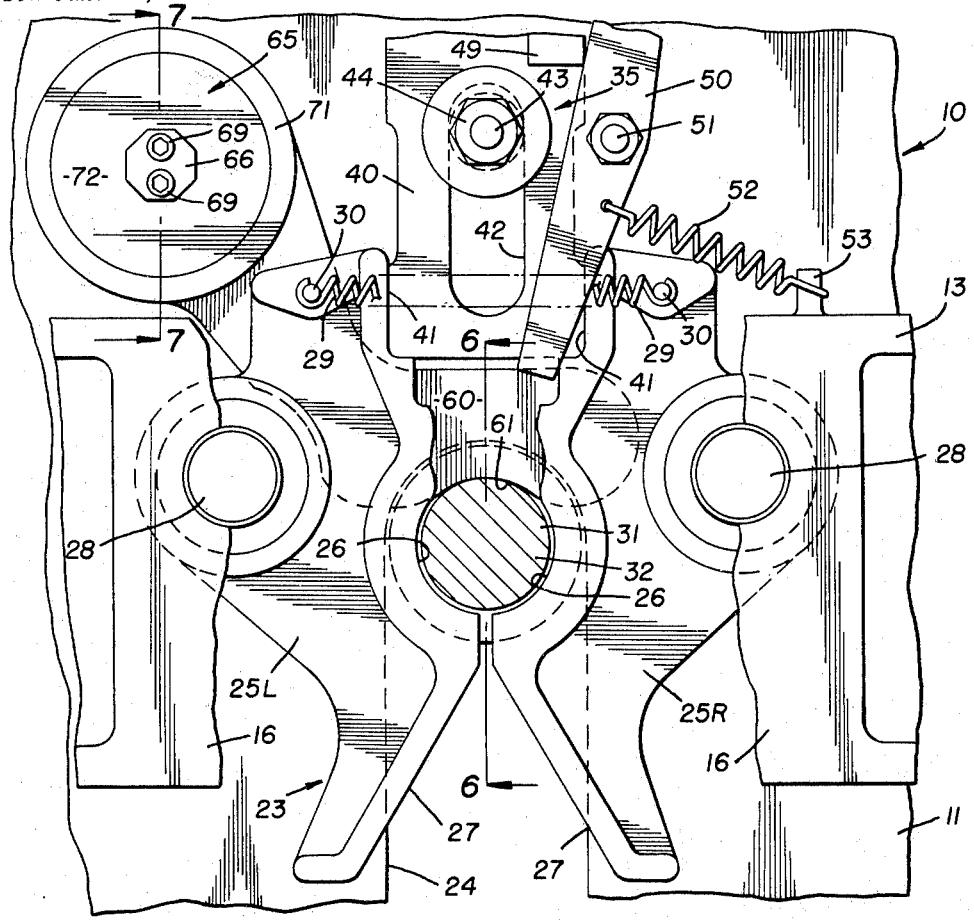
FIG. 5
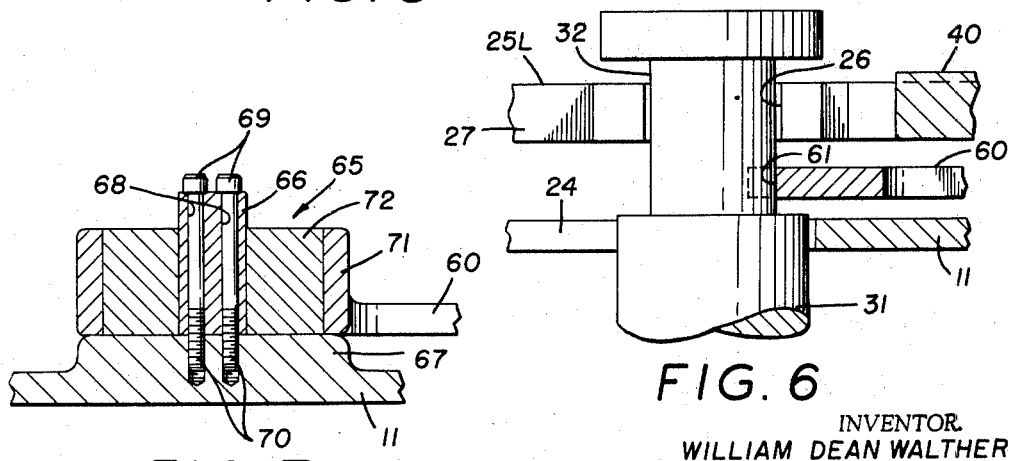
FIG. 7
FIG. 6
INVENTOR.
WILLIAM DEAN WALTHER
BY Hamilton, Cook,
Renner & Kenner
ATTORNEYS

United States Patent Office 3,485,513
Patented Dec. 23, 1969

3,485,513
FIFTH WHEEL COUPLER ASSEMBLY
William Dean Walther, Dayton, Ohio, assignor to The Dayton Steel Foundry Company, Dayton, Ohio, a corporation of Ohio
Continuation-in-part of application Ser. No. 638,473, May 15, 1967. This application Jan. 15, 1969, Ser. No. 791,444
The portion of the term of the patent subsequent to May 5, 1986, has been disclaimed and dedicated to the Public
Int. Cl. B62d 53/06, 53/08
U.S. Cl. 280—435          3 Claims

ABSTRACT OF THE DISCLOSURE

Fifth wheel coupler assembly carried by tractor to engage kingpin on trailer. During coupling a compression bar mounted on a torsilastic rubber bushing absorbs impact of coupling. Thereafter the compression bar engages the kingpin acting as shock absorber for to and fro, oscillatory, motion of the trailer to the tractor.

CROSS-REFERENCE TO RELATED APPLICATION

This application is a continuation-in-part of prior application, Ser. No. 638,473, filed May 15, 1967, now issued as U.S. Patent No. 3,442,533.

BACKGROUND OF THE INVENTION

Fifth wheels according to the invention were developed to improve upon prior art fifth wheels wherein the impact shock of coupling is transmitted to the trailer and cargo and/or tractor and driver. See, for example, the fifth wheel construction of U.S. Patent No. 3,013,815, issued Dec. 19, 1961, having a pair of opposed kingpin coupling jaws.

Prior art fifth wheels having a coupler assembly that absorbs the shock of coupling a kingpin thereto are disclosed in U.S. Patents No. 3,079,175 (Walther) and No. 3,251,610 (Chosy).

It has been found that a fifth wheel coupler assembly to effectively absorb the shock impact of coupling and also absorb the to and fro or oscillatory motion of the trailer to the tractor should provide a predetermined force acting rearwardly through the kingpin when confined by the coupling jaw or jaws. The force applied should serve to prevent the tractor driver from feeling the forward and aft, the to and fro or oscillatory motion associated with the start and stop relative motion normally found in trailer operation.

In general, a coupler assembly according to the invention is used with a fifth wheel mounted on a tractor and having a top plate with a longitudinally directed kingpin slot opening to the rear. A coupler having one or more jaws is mounted beneath the top plate to rotate into the kingpin slot and engage the kingpin on a trailer. When the coupler is closed around a kingpin within the slot a latch mechanism carried beneath the top plate locks the coupler in a kingpin engaging position. When the coupler is locked around the kingpin, a compression bar mounted on a torsilastic rubber bushing forwardly of the slot and extending across the forward end of the slot contacts the kingpin. The movable end of the compression bar is positioned by the torsilastic rubber bushing so as to provide a predetermined force against the kingpin to reduce to and fro or oscillatory motion of the trailer relative to the tractor during over-the-road operation, the compression bar and torsilastic rubber bushing also serving to reduce shock during coupling of the fifth wheel with the kingpin.

SUMMARY OF THE INVENTION

Therefore, it is an object of the present invention to improve the operating characteristics of a fifth wheel on a tractor when coupled with the kingpin on a tractor.

Further, it is an object to improve the operating characteristics of a fifth wheel by elimination or substantial reduction of to and fro or oscillatory motion of the trailer to the tractor during over-the-road operation.

Still further, it is an object to reduce the shock impact of coupling the fifth wheel with the kingpin.

These and other objects which will become apparent from the following specification are accomplished by means hereinafter described and claimed.

DESCRIPTION OF THE DRAWINGS

FIG. 5 is a view similar to FIG. 3, but further enlarged showing the coupler closed around a trailer kingpin;

FIG. 6 is a sectional view taken substantially as indicated on line 6—6 of FIG. 5; and FIG. 7 is a sectional view taken substantially as indicated on line 7—7 of FIG. 5.

DESCRIPTION OF A PREFERRED EMBODIMENT

Figure 1:
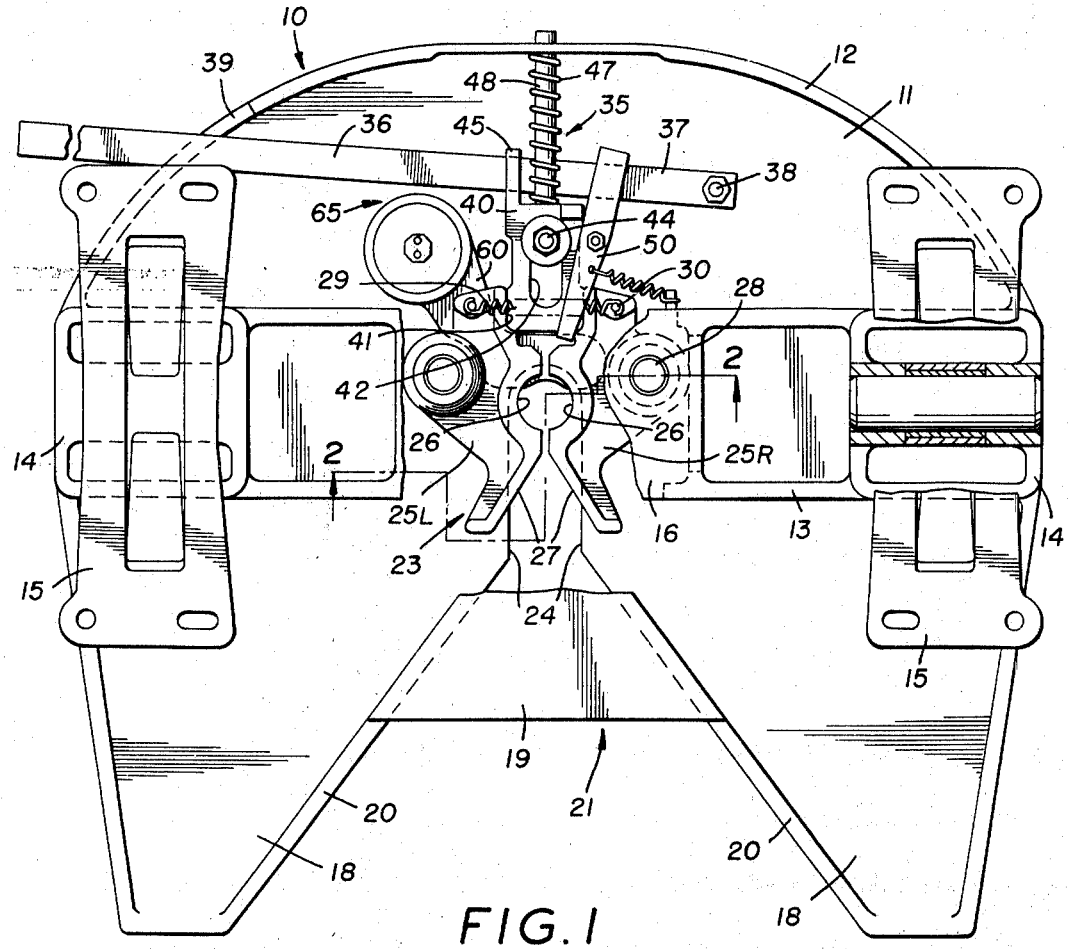
FIG. 1 is a bottom plan view of an improved fifth wheel according to the invention.
Figure 2:
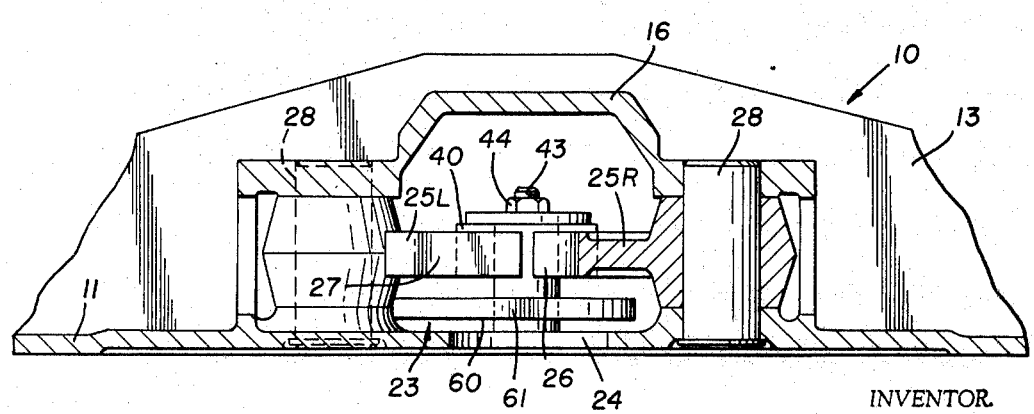
FIG. 2 is an enlarged cross-sectional view taken substantially as indicated on line 2—2 of FIG. 1.

In the drawings the fifth wheel coupler assembly, represented generally by the numeral 10, is incorporated in a fifth wheel having a top plate 11 of conventional shape with a peripheral flange 12 and strengthening webs 13. The top plate is secured to the rear platform of a tractor (not shown) by a pair of depending bosses 14 pivotally connected to supporting brackets 15. In the area between brackets 15 and strengthening webs 13 the underside of the top plate 11 has a dependent underhousing 16 which protects and provides support for the several operating elements described below.

The rear portion of the top plate has rearwardly divergent leg portions 18, reinforced by a bottom web plate 19 forming a rearward extension of the underhousing 16, the inner edges 20 of which define the guide opening 21 adapted to guide a kingpin into engagement with the coupler indicated generally by the numeral 23.

The jaws of the kingpin coupler 23 are pivotally mounted within underhousing 16 so as to rotate horizontally into the longitudinally directed medial or kingpin slot 24 communicating with the guide opening 21. As shown, the kingpin coupler 23 has dual or bifurcated opposed coupling jaws 25L and 25R with complementary arcuate clamping surfaces 26 adapted to partially surround or engage the kingpin and rearwardly projecting cam edges 27. Each coupler jaw 25 pivots on a pin 28 extending between top plate 11 and underhousing 16 and is biased to rotate the cam edges 27 forwardly assuming the open position shown in FIG. 4 by a strong tension spring 29 connected between a depending pin 30 on the forward end of each coupler jaw.

As best seen in FIG. 6, the kingpin 31 attached to the trailer (not shown) has a recessed intermediate or neck portion 32 closely surrounded or engaged by the clamping surfaces 26 of the coupler jaws when the coupler 23 is closed. The coupler 23 is maintained in the closed condition by a latch mechanism indicated generally by the numeral 35.

Referring to FIG. 1, the coupler latch mechanism 35 is carried beneath the top plate 11 and includes a lever 36 having an inner end 37 movably fastened as by a bolt and nut 38. The outer end of lever 36 extends through a slot 39 in the flange 12 to form a handle for actuating the latch mechanism.

Figure 3:
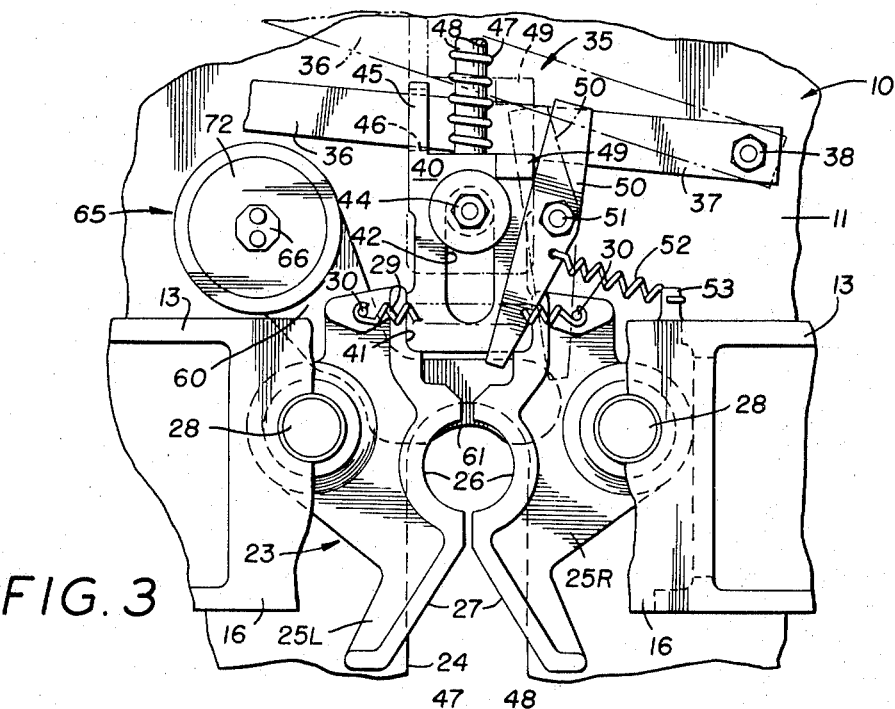
FIG. 3 is another bottom plan view similar to FIG. 1 but enlarged to show details of the fifth wheel when the coupler is closed.
Figure 4:
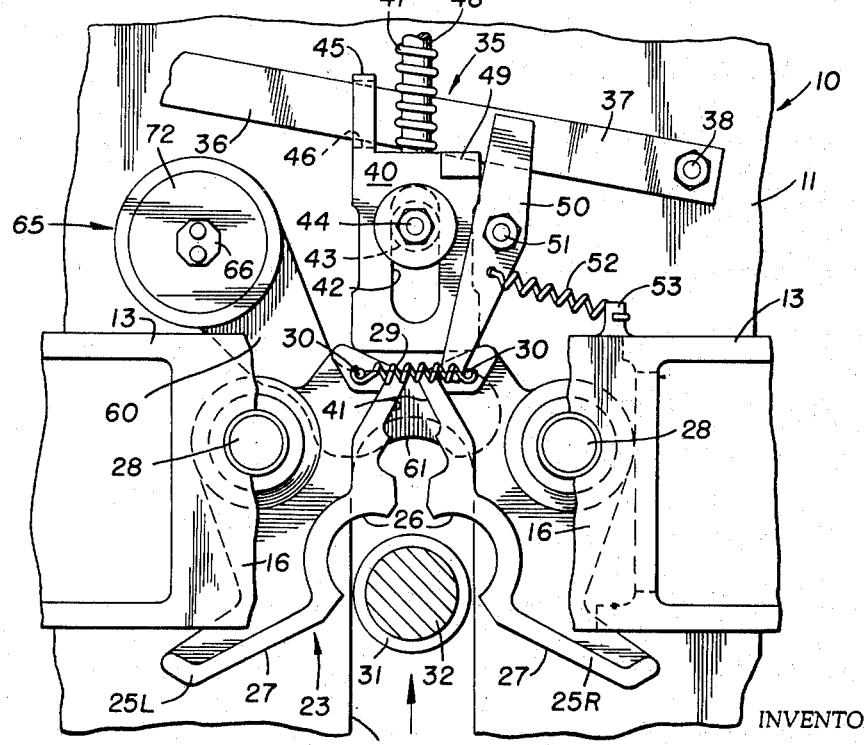
FIG. 4 is a view similar to FIG. 3 showing the coupler open to receive a vehicle kingpin.

Referring to FIGS. 3, 4 and 5, the coupler jaws 25 are locked in the closed position by a sliding plunger block 40 which moves between opposed parallel surfaces 41 on the forward end of each coupler jaw. The plunger block 40 has an elongated slot 42 enclosing a guide stud 43 depending from the top plate 11 and securely fastended as by a lock nut and washer assembly 44. The plunger block 40 also has a forwardly extending ear flange 45 with a horizontal slot 46 for insertion of the medial portion of latch lever 36 therethrough. The plunger block 40 is normally biased toward the coupler jaws 25 by a strong compression spring 47 mounted around a plunger block rod 48 slidably mounted in a suitable bore in the flange 12.

When the plunger block 40 is retracted by movement of the latch lever 36 (to the broken line position in FIG. 3), it is necessary that the plunger block be rendered inoperative or held out of contact with the coupler jaws 25 until the trailer is completely uncoupled from the fifth wheel 10. Accordingly, and in a conventional manner as shown in U.S. Patent No. 2,885,222, a cooperative lock or latch bar 50 is rotatably fastened to the top plate 11 by a bolt, lock nut and washer assembly 51. The forward end of the latch bar 50 is squared so as to engage a latch dog 49 extending downwardly from the forward portion of the plunger block 40 when the plunger block 40 is retracted. The inner end of the latch bar 50 is preferably tapered, so as to slidingly engage a suitable mating surface on the underside of coupling jaw 25R, such as the pin 30. A tension spring 52 is connected between a flange 53 on the underhousing 16 and the midpoint of latch bar 50 so as to cause the end of the latch bar 50 to always be tending to rotate into engagement with the latch dog 49.

The primary object of the invention, the elimination of to and fro or oscillatory motion of the trailer to the tractor during over-the-road operation, is achieved by a compression bar 60 mounted on a torsilastic rubber bushing indicated generally by the numeral 65 and extending across and through the forward end of the kingpin slot 24. The trailing surface or edge of the medial portion of the compression bar 60 is arcuately curved as at 61, to engage the kingpin 31, preferably against the neck portion 32 (see FIG. 6).

Referring to FIG. 7, the torsilastic rubber bushing 65, also referred to as a torsional bushing, has a coaxially inner part or plug 66 fixed or non-rotationally attached to a mounting area or boss 67 on the underside of the top plate 11 forward and to one side of the kingpin slot 24. As shown (see also FIG. 5), the fixed plug 66 is hexagonal in shape and has longitudinal bores 68 to receive two or more bolts 69 having cap heads for tightening and threaded ends 70 inserted into tapped bores in the plate boss 67.

The bushing 65 also has a coaxially outer part or movable ring 71 carrying the forward end of the compression bar 60. The inner surface of the ring 71 is permanently bonded to a preferably cylindrical mass of rubber indicated at 72. The rubber mass 72 is permanently bonded to the outer surface of the plug 66. The rubber mass 72 provides a torque preload to maintain the rearward end of the compression bar 60 in a position such as to effectively absorb the shock impact of coupling and also absorb the to and fro or oscillatory motion of the trailer to the tractor.

Assuming the desired torque preload to be approximately 3000 inch-pounds acting against the kingpin 31; the "moment arm" of compression bar 60, measured perpendicularly from the longitudinal center line of the kingpin 31 (when in contact with the bar 60) to the rotational axis of the ring 71 (the center of plug 66) to be 4.88 inches; the inner diameter of ring 71 to be 3.25 inches; and, the depth of ring 71 to be 1.5 inches—the static shear stress of the bond between the ring 71 and the rubber mass 72 may be determined by mathematical analysis to be approximately 120 pounds per square inch. It has been found a shear stress of 120 pounds per square inch gives satisfactory results for bonds of this nature.

With the above assumed dimensional parameters, and further assuming an available angular deformation of approximately 5° in which to develop an applied torque with a rubber stock of approximately 42 durometer, the radius of the plug 66—and therefore the radial dimension of the rubber mass 72—may be readily calculated from the formula:

$$\phi = \frac{T}{4\pi LG}\left[\frac{1}{R_1^2} - \frac{1}{R_2^2}\right]$$

where $\phi$ = the angular deformation of the bushing 65,
$T$ = the torque to be applied,
$L$ = the depth of the ring 71,
$G$ = the shear modulus of the rubber mass 72,
$R_1$ = the radius of the plug 66, and
$R_2$ = the radius of the ring 71.

Using 5° for $\phi$, 3000 for $T$, 1.5 for $L$, 120 for $G$ and 1.625 for $R_2$, the above formula solves for .5, with the result that the diameter of the plug 66 is one (1) inch and the radial dimension of the rubber mass is 1.125.

The numerical values given just above are illustrative only, it being understood that the torque preload applied to the compression bar 60 should be sufficient so as to effectively absorb the impact shock of coupling of the kingpin 31 and also absorb the to and fro oscillatory motion of the trailer to the tractor.

I claim:
1. A coupler assembly for a fifth wheel mounted on a tractor and having a top plate with a longitudinally directed kingpin slot, a coupler mounted beneath said top plate to rotate into the kingpin slot and engage the kingpin on a trailer, and a latch mechanism carried beneath said top plate to lock the coupler in a kingpin engaging position, characterized in that beneath said top plate there is a compression bar extending across and through the forward end of said kingpin slot, said compression bar being mounted on a torsilastic bushing attached to said top plate, said torsilastic bushing providing a torque preload to the compression bar so as to effectively absorb the impact shock of coupling of the kingpin and also absorb the motion of the trailer to the tractor. tractor.

2. A coupler assembly according to claim 1 wherein said coupler has dual opposed coupling jaws.

3. A coupler assembly according to claim 2 wherein said latch mechanism includes a plunger block movable longitudinally of the kingpin slot and spring-biased so as to be inserted between opposed and parallel faces on the forward end of the dual coupling jaws locking the jaws closed.

References Cited

UNITED STATES PATENTS

| | | | |
|---|---|---|---|
| 2,885,222 | 5/1959 | Walther et al. | 280—436 |
| 3,079,175 | 2/1963 | Walther | 280—434 |
| 3,251,609 | 5/1966 | Daniels | 280—434 |
| 3,251,610 | 5/1966 | Chosy | 280—435 |
| 2,788,989 | 4/1957 | Davies | 280—434 |

LEO FRIAGLIA, Primary Examiner

UNITED STATES PATENT OFFICE
CERTIFICATE OF CORRECTION

Patent No. 3,485,513            December 23, 1969

William Dean Walther

It is certified that error appears in the above identified patent and that said Letters Patent are hereby corrected as shown below:

Column 4, line 39, after "fro" insert -- or --; line 55, afte "the", first occurrence, insert -- to and fro oscillatory --; line 56, cancel "tractor".

Signed and sealed this 2nd day of March 1971.

(SEAL)
Attest:

Edward M. Fletcher, Jr.          WILLIAM E. SCHUYLER, JR.
Attesting Officer              Commissioner of Patents